May 17, 1960  H. G. GENTRY  2,936,560
APPARATUS FOR PACKAGING ARTICLES
Filed June 15, 1956  10 Sheets-Sheet 1

*Fig. 1*

INVENTOR.
HERMOND G. GENTRY
BY
*Parrott & Richards*
ATTORNEYS

May 17, 1960  H. G. GENTRY  2,936,560
APPARATUS FOR PACKAGING ARTICLES
Filed June 15, 1956  10 Sheets-Sheet 2

INVENTOR.
HERMOND G. GENTRY
BY
Parrott & Richards
ATTORNEYS

May 17, 1960 H. G. GENTRY 2,936,560
APPARATUS FOR PACKAGING ARTICLES
Filed June 15, 1956 10 Sheets-Sheet 3

INVENTOR.
HERMOND G. GENTRY
BY
Parrott & Richards
ATTORNEYS

May 17, 1960  H. G. GENTRY  2,936,560
APPARATUS FOR PACKAGING ARTICLES
Filed June 15, 1956  10 Sheets-Sheet 5

INVENTOR.
HERMOND G. GENTRY
BY
Parrott & Richards
ATTORNEYS

May 17, 1960 H. G. GENTRY 2,936,560
APPARATUS FOR PACKAGING ARTICLES
Filed June 15, 1956 10 Sheets-Sheet 6

INVENTOR.
HERMOND G. GENTRY
BY
Parrott & Richards
ATTORNEYS

May 17, 1960  H. G. GENTRY  2,936,560
APPARATUS FOR PACKAGING ARTICLES
Filed June 15, 1956  10 Sheets-Sheet 7

INVENTOR.
HERMOND G. GENTRY
BY
Parrott & Richards
ATTORNEYS

May 17, 1960  H. G. GENTRY  2,936,560
APPARATUS FOR PACKAGING ARTICLES
Filed June 15, 1956  10 Sheets-Sheet 8

INVENTOR.
HERMOND G. GENTRY
BY
Parrott & Richards
ATTORNEYS

May 17, 1960 H. G. GENTRY 2,936,560
APPARATUS FOR PACKAGING ARTICLES
Filed June 15, 1956 10 Sheets-Sheet 9

INVENTOR.
HERMOND G. GENTRY
BY
*Parrott & Richards*
ATTORNEYS

May 17, 1960 H. G. GENTRY 2,936,560
APPARATUS FOR PACKAGING ARTICLES
Filed June 15, 1956 10 Sheets-Sheet 10

INVENTOR.
HERMOND G. GENTRY
BY
*Parrott & Richards*
ATTORNEYS

United States Patent Office 2,936,560
Patented May 17, 1960

1

2,936,560

APPARATUS FOR PACKAGING ARTICLES

Hermond G. Gentry, Atlanta, Ga., assignor, by mesne assignments, to Mead Packaging, Inc., a corporation of Ohio Application June 15, 1956, Serial No. 591,632

7 Claims. (Cl. 53—219)

This invention relates to apparatus for packaging articles, such as cans, in a wrapper blank proportioned to fold over and overlap beneath a package group of the the articles, and more particularly to an extremely simple apparatus of this sort arranged for operation effectively by hand.

Briefly described, the apparatus of the present invention is characterized by means for supporting a package group of the articles at a folding station to have a packaging blank wrapped thereon, and means for securing the wrapped blank on the package group at a locking station, together with a hopper structure arranged above said securing means to contain a supply of wrapper blanks conveniently disposed for use at said folding station; the wrapper blanks being removed from the hopper structure, wrapped about a package group of the articles at the folding station, and the wrapped package group being transferred to the locking station for securing, all by hand in a uniquely simple and effective manner.

These and other features of the present invention are described in detail below in connection with the accompanying drawings, in which.

2

Figure 1:
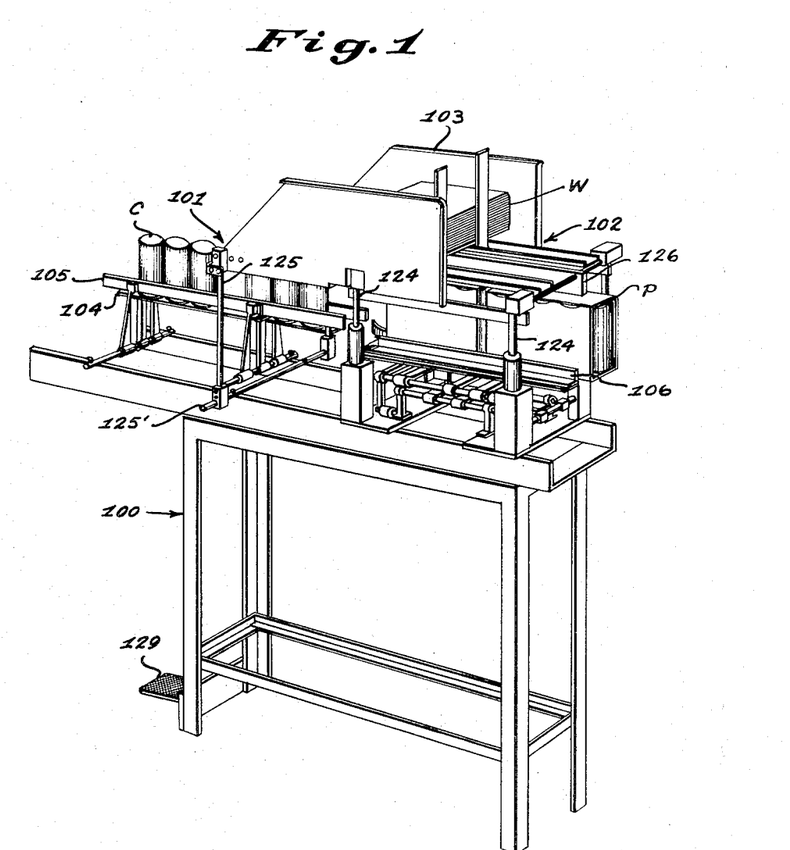
Fig. 1 is a perspective view of a packaging apparatus embodying the present invention.

Referring now in detail to the drawings, and more particularly at first to Fig. 1, the illustrated embodiment of the packaging apparatus of the present invention comprises a frame structure, indicated generally by the reference numeral 100, on which a folding station is arranged at 101, a locking station at 102, and a hopper structure at 103 for containing a stacked supply of wrapper blanks W to be wrapped on a package group of cans C at the folding station 101 in a manner that allows transfer of the wrapper enclosed package group to the locking station 102 for securing to form a completed package P.

The folding station 101 is formed by an elongated plate member 104 no wider than the package group of cans C to be wrapped and a pair of guide strips 105 spaced above and at each side of the plate member 104 for confining the cans C of the package group laterally in centered relation thereon, so that a wrapper blank W may be folded downwardly over the package group and guide strips 105 and overlapped beneath the plate member 104, and the resulting wrapper enclosed package group may then be stripped from the plate member 104 and guide strips 105 for transfer to the locking station 102.

The locking station 102 is in turn formed to receive a wrapper enclosed package group from the folding station on a guideway 106 aligned with the plate member 104 and guide strips 105 and having a positioning element arranged adjacent the entrance end thereof, as explained in detail further below, past which the wrapper enclosed package group from the folding station 101 may be advanced and then retracted to an abutting position for proper location at the locking station.

Figures 2, 3:
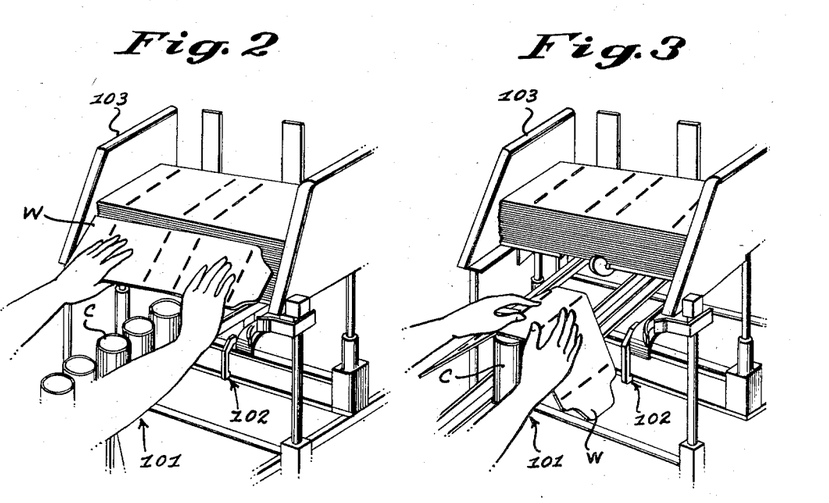
Fig. 2 is a fragmentary perspective view showing a wrapper blank being removed from the hopper structure for use at the folding station.
Fig. 3 is a fragmentary perspective view showing the wrapper blank being folded downwardly over the sides of a package group at the folding station.
Figures 4, 5:
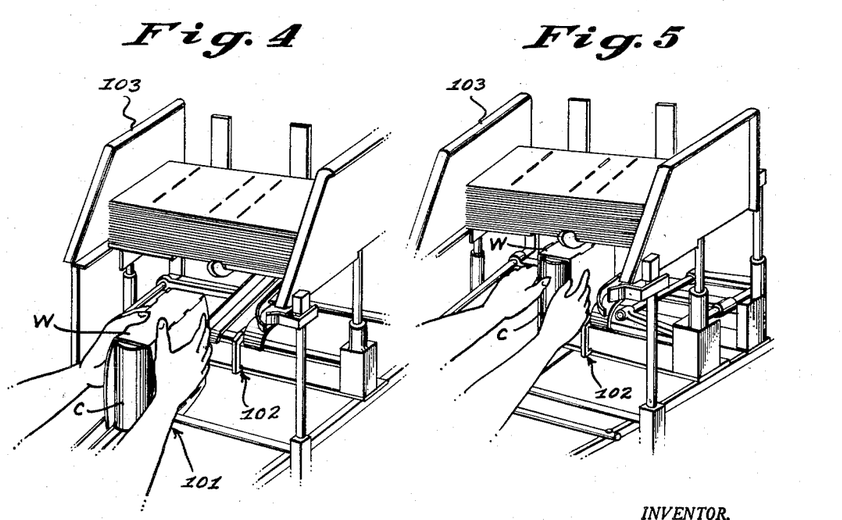
Fig. 4 is a fragmentary perspective view showing the folding of the wrapper blank being completed in preparation for transfer of the wrapper enclosed package group to the locking station.
Fig. 5 is a fragmentary perspective view showing the wrapper enclosed package group being transferred to the locking station.

The manner in which these steps are carried out with the apparatus of the present invention is illustrated in Figs. 2, 3, 4 and 5. Fig. 2 shows a wrapper blank W being taken from the stacked supply contained by the hopper structure 103 for application to a package group of cans C previously positioned by hand at the folding station 101. In Fig. 3, the wrapper blank W is shown being folded downwardly over the sides of the positioned package group, and Fig. 4 shows this folding being completed over the guide strips 105 in preparation for overlapping of the wrapper blank W beneath the package group and plate mmeber 104; while Fig. 5 illustrates the transfer of the wrapper enclosed package group to the guideway 106 for securing at the locking station 102.

Figures 6, 7, 8:
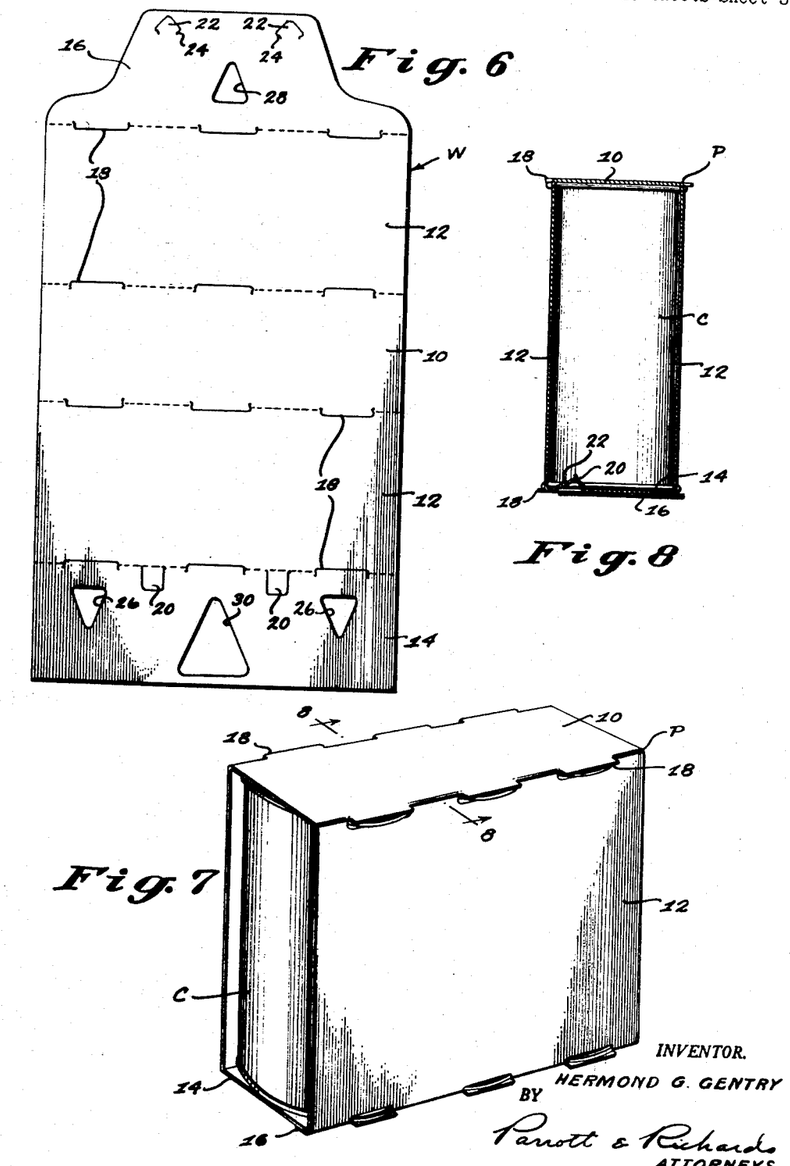
Fig. 6 is a plan view of a representative form of the wrapper blank employed for packaging a group of articles with the apparatus of the present invention.
Fig. 7 is a perspective view of a package group enclosed by a wrapper blank such as is shown in Fig. 6.
Fig. 8 is a sectional detail taken substantially on the line 8—8 in Fig. 7.

The form of wrapper blank W employed for packaging a group of articles in this manner with the apparatus of the present invention is of the type disclosed and claimed in copending application Serial No. 459,918, filed October 4, 1954, now U.S. Patent No. 2,786,572. As disclosed in this copending application, and as illustrated in Figs. 6, 7 and 8, the wrapper blank W comprises a top wall panel 10, a pair of side wall panels 12 foldably hinged at opposite edges of the top wall panel 10, and a pair of bottom wall half laps 14 and 16 foldably hinged at the respective bottom edges of the pair of side wall panels 12 and proportioned to overlap at their extending edge portions to form a rectangular four-sided package P having the ends thereof entirely open as seen in Fig. 7.

The top wall panel 10, side wall panels 12, and bottom wall half laps 14 and 16 comprise portions of a unitary blank (see Fig. 6) which is generally rectangular in form and is transversely scored to arranged these portions in a foldably hinged series, with all of the portions having an equal length transversely of the blank W that is substantially equal to the length of the package group of cans C to be packaged therein. The bottom wall half laps 14 and 16 when overlapped form a bottom wall having a width equal to that of the top wall panel 10 and substantially equal to the diameter of the cans C so that the wrapper blank W is arranged to enclose a package group formed by a single row of cans C, and each side wall panel 12 is suitably notched adjacent its foldably hinged edges to provide positioning slots for the cans C along each side wall as indicated at 18. Alternatively, the top wall panel 10 and bottom wall half laps 14 and 16 may be proportioned to package a group of cans C arranged in two rows as illustrated in the above noted copending application.

The wrapper blank W as arranged in the above noted manner is adapted to be applied to a package group of cans C and secured thereon during a packaging operation by an arrangement of the bottom wall half laps 14 and 16 for interlocking engagement to secure the wrapper blank W in place without, if desired, requiring any glue application at the overlapping bottom wall. For this purpose, the inner bottom wall half lap 14 has retaining tabs slit therein as at 20, and the outer bottom wall half lap 16 has related locking tabs 22 slit in the overlapping edge portion thereof.

Both of the retaining tabs 20 and locking tabs 22 are arranged, respectively, to remain hinged to the bottom wall half laps 14 and 16 remotely with respect to the extending edges thereof, so that they fold in opposed relation, and the hinged extent of the retaining tabs 20 is made slightly greater than that the locking tabs 22 so that the latter may be extended inwardly through the overlapping edge portion of the inner bottom wall half lap 14 at the respective retaining tabs 20 therein. The spacing of the tabs 20 and 22 is such as to locate them at the dead spaces between adjacent cans C in a package group, and thereby employ this dead space to provide clearance for manipulating the tabs into locking engagement.

The locking tabs 22 are further specially formed with widened extending end portions forming shoulders thereon as at 24 which are proportioned to overlie the inner bottom wall half lap 14 at each side of the retaining tabs 20 and thereby effect a locking engagement between the bottom wall half laps 14 and 16. Upon extension of the shouldered locking tabs 22 into this locking engagement, the retaining tabs 20 are displaced upwardly at the extending ends of the locking tabs 22 so as to bias the engaged locking tabs 22 in place (see Fig. 8).

The bottom wall half laps 14 and 16 are each further advantageously formed with apertures 26 and 28 spaced from the ends thereof and from the adjacent side wall panel 14 for location within the diameter of a can C packaged in the wrapper W so as to provide clearance at these apertures 26 and 28 for gripping the bottom wall half laps 14 and 16 and holding them in proper overlapping relation while the locking tabs 22 are manipulated into locking engagement, as explained further below. In this connection, it should be noted that in the wrapper blank W illustrated in Fig. 6, the outer bottom wall half lap 16 purposely has the end portions thereof relieved and the inner bottom wall half lap 14 is formed wtih an enlarged aperture 30 so as to make the apertures 26 and 28 readily accessible for this purpose.

Figure 9:
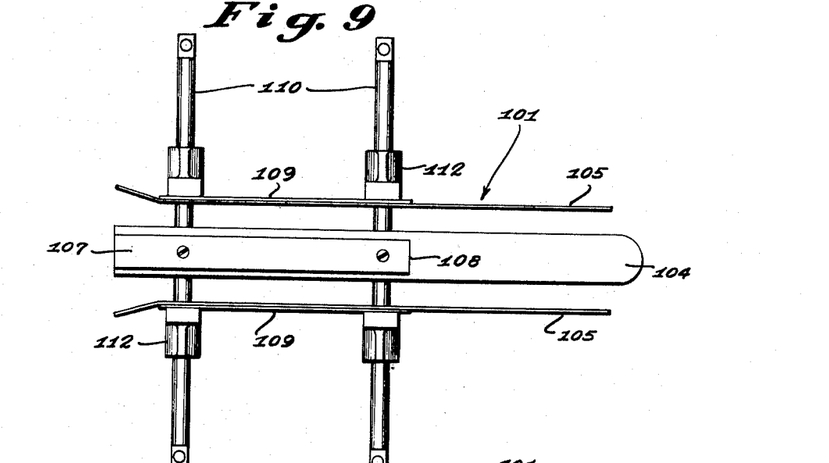
Fig. 9 is a plan view of the means provided for supporting a package group at the folding station according to the present invention.
Figure 10:
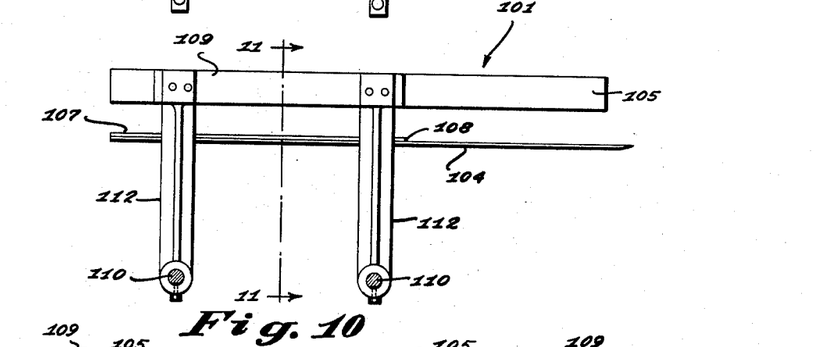
Fig. 10 is a side elevation corresponding to Fig. 9.
Figure 11:
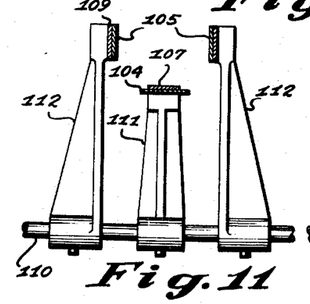
Fig. 11 is a sectional detail taken substantially on the line 11—11 in Fig. 10.

Figs. 9, 10 and 11 illustrate more in detail the structural arrangement of the plate member 104 and guide strips 105 forming the folding station 101, the plate member 104 being shown as having an unsupported length reaching to one end thereof (i.e., to the right in Figs. 9 and 10, which corresponds to the discharge end adjacent the locking station 102). This unsupported length of the plate member 104 has an extent exceeding the length of the package group to be wrapped and it is here that the folding station 101 proper is located.

The remaining supported length of the plate member 104 has a stiffening strip 107 fixed at its top face and terminating to form an abutment shoulder at 108 against which a package group of cans C may be located on the unsupported length of the plate member 104 to arrange them properly at the folding station 101. The guide strips 105 spaced above and at each side of the plate member 104 are also arranged with an unsupported length toward their discharge end that is substantially coextensive with the unsupported length of the plate member 104, and have stiffening strips 109 fixed at the outer face thereof along their supported length, beyond which they are flared outwardly to form an entrance end at which the cans C is to be packaged may be readily placed therebetween on the plate member 104.

Figure 12:
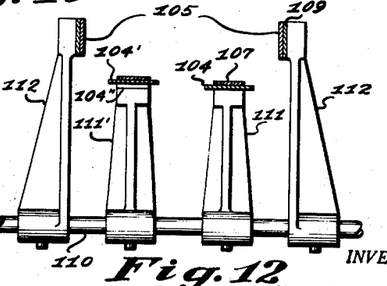
Fig. 12 is a further sectional detail corresponding to Fig. 11, but showing a modified arrangement for accommodating a package group formed by two rows of articles.

The plate member 104 and guide strips 105, and the stiffening strips 107 and 109 thereof, are carried on support rods 110 arranged for attachment to the frame structure 100 and fitted with laterally adjustable standards 111 and 112 to which the plate member 104 and guide strips 105, respectively, are fixed. The laterally adjustable standards 111 and 112 not only allow for selective spacing of the guide strips 105 to fit a particular size of can C being packaged, but also provide for the use of additional standards 111' (as illustrated in Fig. 12) to support a second plate member 104' so that a package group of cans C arranged in two rows may be handled for packaging. In this event the additional standards 111' are preferably shimmed, as indicated at 104", to raise the second plate member 104' above the level of the other plate member 104 for internesting the can chines during wrapping and thereby obtain a tighter completed package as disclosed in copending application Serial No. 593,627, filed June 25, 1956, now U.S. Patent No. 2,809,484.

Figure 13:
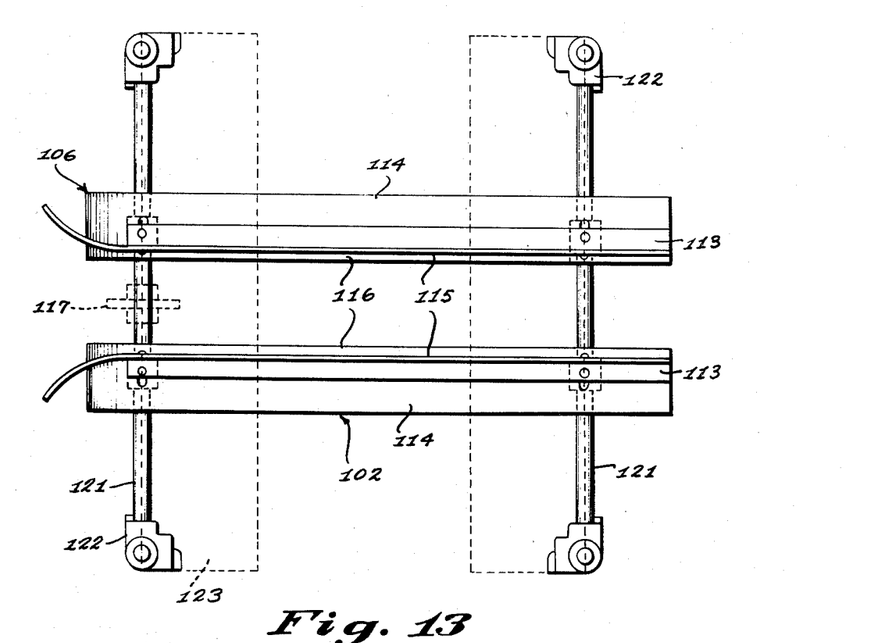
Fig. 13 is a plan view of the guideway provided at the locking station according to the present invention.
Figure 14:
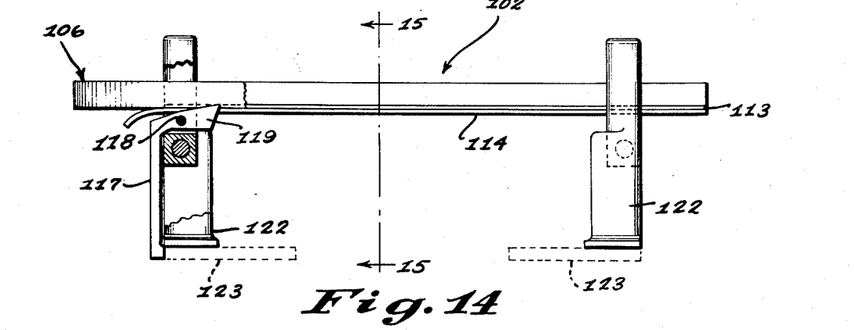
Fig. 14 is a side elevation corresponding to Fig. 13.
Figure 15:
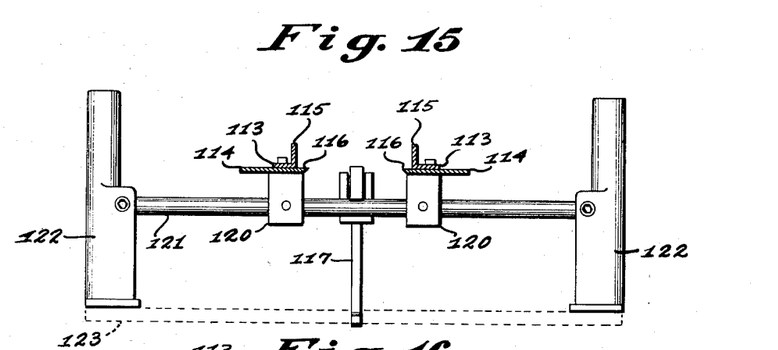
Fig. 15 is a sectional detail taken substantially on the line 15—15 in Fig. 14.

The arrangement of the guideway 106 aligned with the folding station 101 for receiving and supporting a wrapper enclosed package group of cans C at the locking station 102 is illustrated further in Figs. 13, 14 and 15 as comprising a pair of guides formed by angle members 113 fixed in spaced relation from the inner edges of parallelly spaced horizontal bottom plates 114, so that the angle members 113 each present a flange portion 115 standing uprightly and a related horizontally extending flange portion 116 is formed at the inner edges of the bottom plates 114 for supporting and laterally positioning a wrapper enclosed package group of cans C adjacent the bottom side edges thereof to leave the overlapped bottom half laps 14 and 16 of the wrapper blank W otherwise free for tightening and interlocking.

In order to facilitate the transfer of wrapper enclosed package groups of the cans C to the guideway 106, entrance end portions of both the upright flange portion 115 of angle members 113 and the bottom plates 114 are curved, respectively, outward and downward as shown in Figs. 13 and 14. Also, a locating means or positioning element, as previously mentioned, is arranged adjacent the entrance end of the guideway 106 in the form of a latch member 117 pivoted centrally between the bottom plates 114 on a transverse axis disposed, as indicated at 118 in Fig. 14, below the level of the bottom plates 114, and having a latching leg portion 119 extending in the direction of the discharge end of the guideway 106 and biased by the weighted disposition of the latch member 117 otherwise to maintain the extending end of this latching leg portion 119 normally raised above the level of the bottom plates 114, so that a wrapper enclosed package group of cans C being transferred from the folding station 101 will first depress this latching leg 119 as it is advanced onto the guideway 106 until it passes thereover, whereupon the latching leg 119 will rise again to its normal position to present its extending end as an abutment against which the wrapped package group may be retracted for proper location at the locking station 102.

Figure 16:
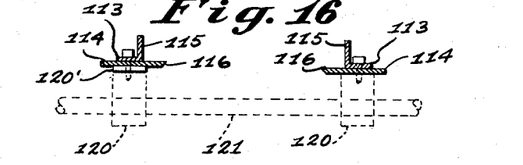
Fig. 16 is a further sectional detail corresponding to Fig. 15, but showing a modified arrangement for accommodating a package group formed by two rows of articles.

The guideway 106 is arranged on mounting blocks 120 carried, as in the case of the plate member 104 and guide strips 105, for lateral adjustment on support rods 121 so as to allow for selective spacing in accordance with the size of can C being handled; or to provide for handling a package group formed by two rows of cans C, in which case one of the mounting blocks 121 is fitted with shimming, as indicated at 120' in Fig. 16, for maintaining the can chines internested as previously mentioned. The guideway support rods 121 extend between corner posts 122 fixed on support plates 123 that are attached to the frame structure 10 (see Fig. 1), and that carry the means provided for securing the wrapper blank W about the package group of cans C as is described in detail further below. The corner posts 122 are also fitted with vertical support rods 124 which, together with further support rods 125 extending vertically from an additional horizontal support rod 125' adjacent folding station 101, mount the hopper structure 103 above the locking station 102 at a spacing sufficient to clear the advance of a wrapped package group onto the guideway 106, with a bottom support member 126 for the stacked supply of wrapper blanks preferably arranged to serve also as a hold-down bar for the advanced package group at the locking station 102 (see Fig. 1).

Figure 17:
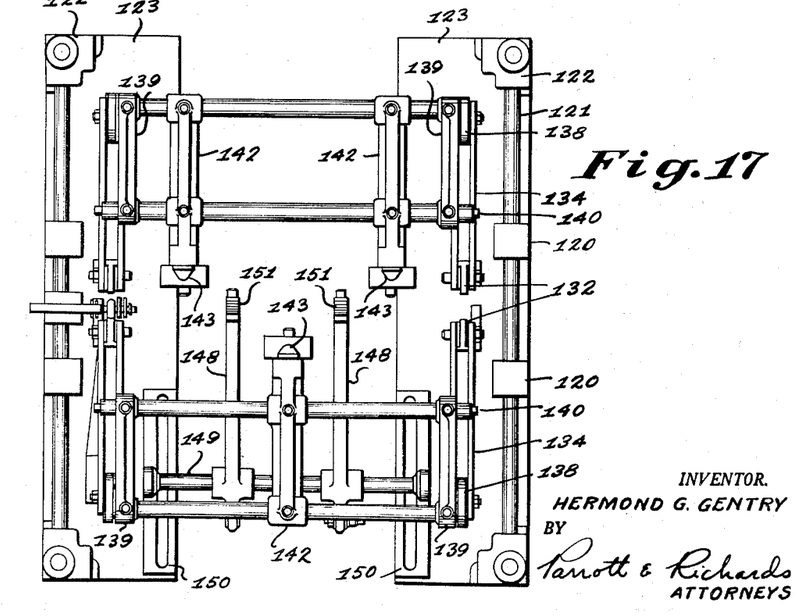
Fig. 17 is a plan view of the means provided for securing the wrapper blank at the locking station according to the present invention.
Figure 18:
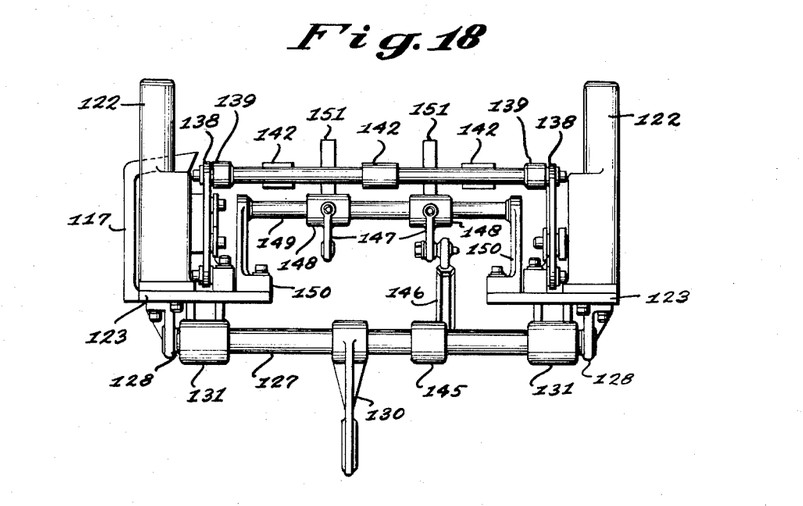
Fig. 18 is a side elevation corresponding to Fig. 17.
Figure 19:
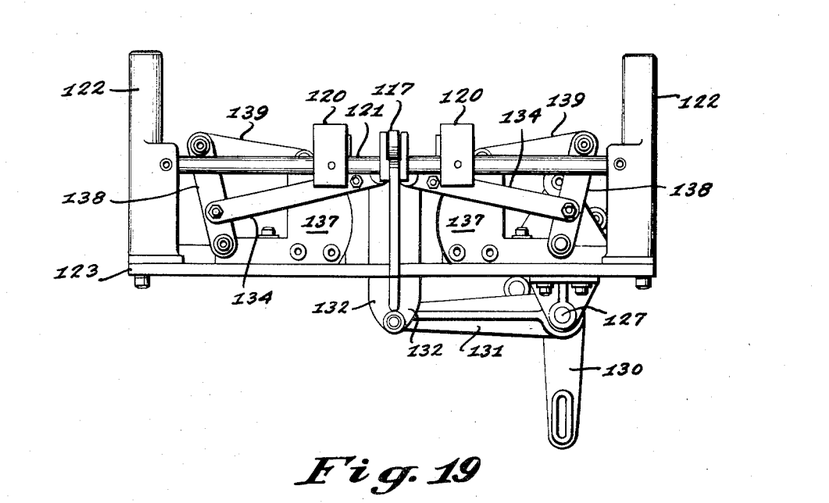
Fig. 19 is a left end elevation corresponding to Fig. 18.

Figs. 17, 18 and 19 show in detail the means arranged at the locking station 102 below the guideway 106 for securing the wrapper blank W about a package group of cans C to form a completed package P. As shown, this means comprises a rock shaft 127 mounted in bearing brackets 128 at the underside of the previously noted support plates 123, and through which the securing means may be actuated from a foot pedal or the like, as indicated at 129 in Fig. 1, a downwardly extending rock arm 130 being carried on the shaft 127 for connection in any suitable manner (not shown) with the foot pedal 129 to operate the rock shaft 127.

For tightening and securing a wrapper blank W on a package group of cans C, the operating connection to the rock arm 130 is such as to cause pivoting movement thereof to the right (as seen in Fig. 19) and consequent counterclockwise rotation of the rock shaft 127. Such motion in turn causes additional, laterally, extending, rock arms 131 carried on the rock shaft 127 adjacent each end thereof (see Figs. 20, 21 and 22) to pivot downwardly and thereby pull downwardly on pairs of connecting rods 132 mounted on pivot pins 133 at the extending ends of these additional rock arms 132.

The upper ends of these connecting rods 132 (as seen best in Figs. 23, 24 and 25) are pivotally connected to an end of cam levers 134 carrying follower rolls 135 intermediate their length for operation at a cam surface 136 of cam blocks 137 arranged at the top face of support plates 123, and having the other ends thereof connected intermediate the length of pivot levers 138 extending to arm members 139 that are fitted with follower rolls 140 for operation at a second cam surface 141 on the cam blocks 137 and that carry, in parallel spaced relation and for corresponding motion therewith, further arm members 142 at the extending ends of which lug elements 143 are arranged to fit the bottom wall half lap apertures 26 and 28 in the wrapper blank W.

Figure 23:
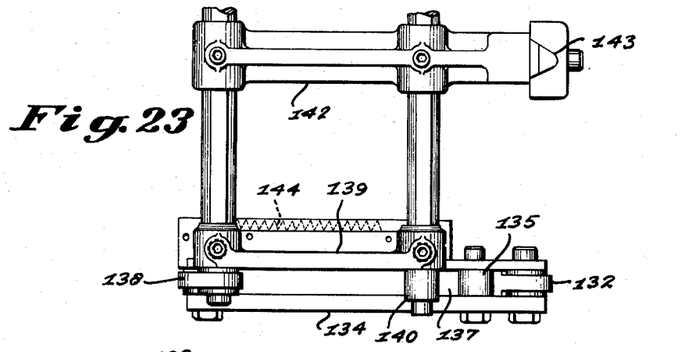
Fig. 23 is an enlarged fragmentary detail in plan of the operating arrangement for the means provided at the locking station for tightening the wrapper blank on a package group thereat before the blank is secured.
Figure 24:
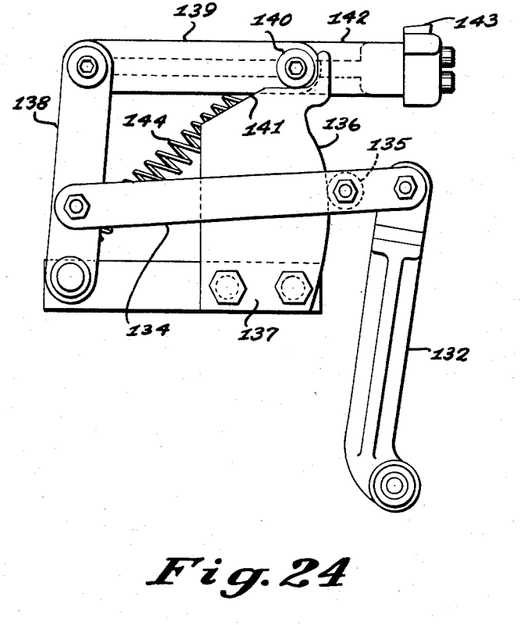
Fig. 24 is a side elevation corresponding to Fig. 23.
Figure 25:
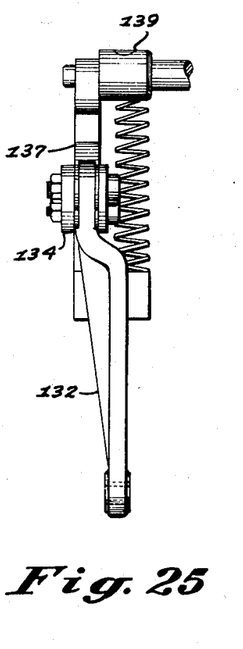
Fig. 25 is a right end view corresponding generally to Fig. 24.

The result of this arrangement is to employ the downward movement of the connecting rods 132 to shift the lug elements 143 laterally inward of the guideway 106 for tightening a wrapper blank W about a wrapped package group of cans C supported thereon. The cam surface 141 on the cam block 137 is such as to cause the arm member 139 to rise initially during this inward shifting so as to insert the lug elements 143 in the wrapper blank apertures 26 and 28, and then draw the blank W tight during the remainder of the inward shift. The inward shifting of the lug elements 143 is actuated from the other cam surface 136 of cam blocks 137 through the cam levers 134 that act on pivot levers 138 and arm members 139 against the bias of return springs 144. This cam surface 136 is shaped to actuate the inward shifting at its upper portion in an extent sufficient to effect adequate tightening action by the lug elements 143 and then to provide a dwell at its lower portion during which the lug elements 143 remain stationary to hold the tightened wrapper blank W while the bottom half laps 14 and 16 thereof are secured.

Figure 20:
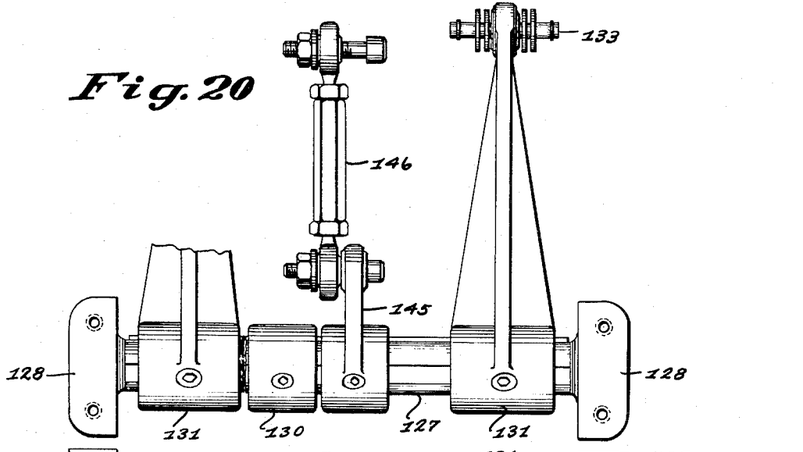
Fig. 20 is an enlarged fragmental detail in plan of the actuating rock shaft for the securing means shown in Figs. 17, 18 and 19.
Figures 21, 22:
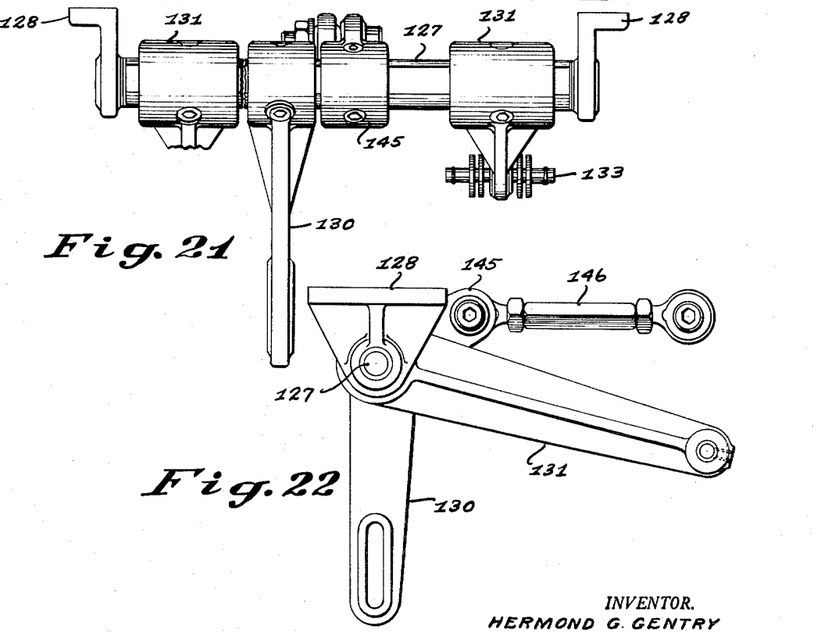
Fig. 21 is a side elevation corresponding to Fig. 20.
Fig. 22 is a right end elevation corresponding to Fig. 21.
Figure 26:
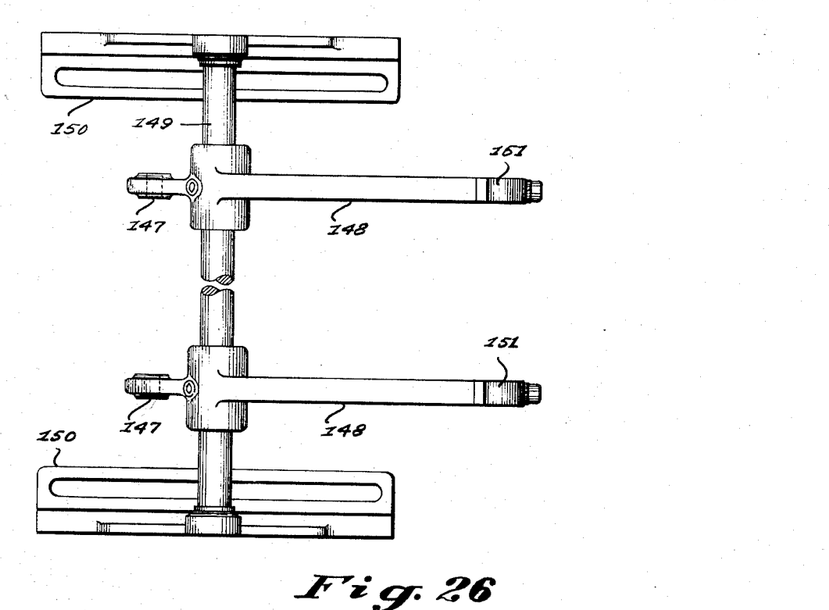
Fig. 26 is an enlarged fragmentary detail in plan of the means provided at the locking station for securing a tightened wrapper blank.
Figure 27:
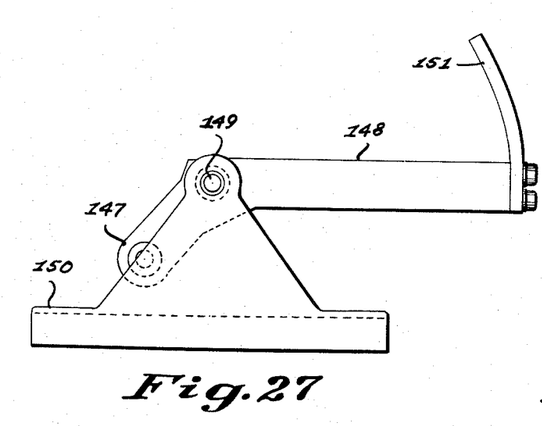
Fig. 27 is a side elevation corresponding to Fig. 26.
Figure 28:
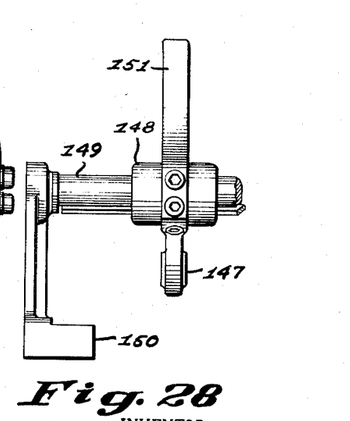
Fig. 28 is a right end view corresponding generally to Fig. 27.

The operation of securing these half laps 14 and 16 is also actuated from the rock shaft 127 through a further rock arm 145 carried thereon to operate a connecting rod 146 (see Figs. 20, 21, and 22). The previously mentioned counterclockwise operating rotation of rock shaft 127 as seen in Fig. 19 corresponds to clockwise rotation in Fig. 22, and such rotation results in pivoting rock arm 145 downwardly. The connecting rod 146 extends from the rock arm 145 to a pivot leg portion 147 of a locking arm 148 carried on an upwardly spaced additional rock shaft 149 mounted in bearing brackets 150 at the top face of support plates 123 (see Figs. 26, 27 and 28). The locking arm 148 is fitted at its extending end with an arcuate finger element 151 that is shaped for pressing the wrapper blank locking tabs 22 to interlocked position, and a locking arm 148 and finger element 151 is provided for each locking tab 22 in the wrapper blank W. Fig. 27 shows the locking arm 148 and finger element 151 thereon in raised position at the end of its oscillating stroke. Initially the locking arm 148 is at a lowered position so that the upper end of the finger element 151 is spaced below the overlapped bottom half laps 14 and 16 of a wrapper blank W enclosing a package group of cans C on the guideway 106, and the finger element 151 does not engage a locking tab 24 until the lug elements 143 have been fully shifted inward to draw the wrapper blank W tight. The upward movement of the finger elements 151 is timed, however, to reach the locking tabs 22 as soon as the inward shifting of the lug elements 143 has been completed and the previously noted dwell thereof commences. Continued upward movement of the finger elements 151 thereupon results in pressing the locking tabs 22 through the inner overlapping half lap 14 at the retaining tabs 20 therein to interlock them and thereby secure the wrapper blank W to form a completed package P. The mechanism is then allowed to recover under the force of the return springs 144 for repeating the above described operation on a succeeding wrapper enclosed group of cans C which will act as it is transferred to the guideway 106 to shove the completed package P beyond the locking station 102 without separate attention.

The present invention has been described in detail above for purposes of illustration only and is not intended to be limited by this description or otherwise except as defined in the appended claims.

I claim:

1. Apparatus for packaging articles in a wrapper blank comprising means for supporting a package group of said articles at a folding station to have said blank wrapped thereon and means for securing the wrapped blank on said package group at a locking station; said supporting means including a plate member no wider than said package group and a pair of guide strips spaced above and at each side of said plate member for confining said package group in centered relation thereon, whereby a wrapper blank may be folded downwardly over said package group and strip elements and overlapped beneath said plate member and the resulting wrapper enclosed package group may then be stripped from said plate member and guide strips; and said securing means including a guideway aligned with said plate member and guide strips for receiving a wrapper enclosed package group stripped therefrom and a positioning element pivotally mounted adjacent the entrance end of said guideway on a transverse axis disposed below the level of said guideway and extending in the direction of the discharge end thereof with a biased disposition of its extending end above said level, whereby a wrapper enclosed package group stripped from said plate member may be advanced onto said guideway past said positioning element and then retracted to an abutting position therewith for proper location at said locking station.

2. Apparatus as defined in claim 1 and further characterized in that a hopper structure is arranged above said securing means to contain a stacked supply of wrapper blanks conveniently disposed for use at said folding station, said hopper structure being spaced above said securing means sufficiently to clear the advance of a wrapper enclosed package group onto said guideway and including a bottom support member for said stacked supply of wrapper blanks arranged also to serve as a hold-down bar for said advanced package group at said locking station.

3. Apparatus for packaging articles in a wrapper blank comprising at least one plate member and a pair of guide strips for positioning and supporting a package group at a folding station to have said blank wrapped thereon, said plate member having a width no wider than said package group and having an unsupported length reaching to one end thereof in an extent exceeding the length of said package group with a stiffening strip fixed at the top face of the remaining supported length thereof and terminating to form an abutment shoulder against which said package group may be located on said unsupported length for wrapping of said blank thereon, and said guide strips being spaced above and at each side of said plate member for confining said package group laterally in centered relation thereon and having an unsupported length at one end substantially coextensive with the unsupported length of said plate member, whereby a wrapper blank may be folded downwardly over said package group and strip elements and overlapped beneath said plate member and the resulting wrapper enclosed package group may then be stripped from said plate member and guide strips.

4. Apparatus for packaging articles in a wrapper blank comprising a guideway for receiving and supporting a package group of said articles with said wrapper blank folded downwardly over and overlapped beneath said package group, and means for locating said wrapper enclosed package group on said guideway at a locking station to have the overlapped portions of said blank secured; said guideway being formed by a pair of guides spaced in parallel relation, and arranged with one flange portion standing uprightly and another flange portion extending horizontally toward the opposite guide of said pair for supporting and laterally positioning said wrapper enclosed package group adjacent the bottom side edges thereof, and with entrance end portions of said flange portions curved, respectively, outward and downward for receiving said wrapper enclosed package group; and said locating means being formed by a latch member pivoted adjacent the entrance end of said guideway centrally between said guides on a transverse axis disposed below the level of said horizontal flange portions and having a latching leg portion extending in the direction of the discharge end of said guideway and biased for maintaining the extending end of said leg portion normally raised above the level of said horizontal flange portions, whereby a wrapper enclosed package group received on said guideway may be advanced past the extending end of said leg portion and then retracted in abutting relation therewith for proper location at said locking station.

5. Apparatus for packaging cylindrical articles, such as cans, in a wrapper blank proportioned to fold over and overlap beneath a package group of said articles and having securing means formed by aligned locking and retaining tabs in the respective outer and inner overlapping blank portions arranged in alignment with the space in a packaged group of said articles resulting from the cylindrical form of said articles, with apertures also formed in said overlapping blank portions at locations within the diameters of articles in said package group for gripping and drawing said blank tight about said package group before securing said locking tabs; said apparatus comprising a guideway for receiving a package group of said articles having a wrapper blank folded thereon and for supporting said wrapped package group adjacent the bottom side edges thereof in position to have said wrapper blank tightened and secured thereon, and means for drawing said wrapper blank tight about said package group and securing said locking tabs while said package group is supported on said guideway; said means being formed by a rock shaft, lug members shaped to fit within the apertures in said overlapping blank portions and linked to said rock shaft, cam means causing said lug members to reciprocate laterally of said guideway upon actuation by said rock shaft, to rise within said apertures upon reciprocation inwardly of said guideway, and to dwell at the end of the inward stroke thereof, and finger elements also linked to said rock shaft and actuated thereby for pressing said locking tabs through the inner overlapping blank portion at said retaining tabs during the dwell of said lug members.

6. Apparatus for packaging articles in a wrapper blank proportioned to fold over and overlap beneath a package group of said articles and having means formed in the overlapping blank portions for interlocking to secure said blank about said package group, with apertures also formed in said blank portions to allow gripping thereof for drawing said blank tight before securing said interlocking means, said apparatus comprising a guideway for receiving and positioning a package group of articles having a wrapper blank folded thereon and for supporting said wrapped package group adjacent the bottom side edges thereof and outwardly of said overlapping blank portion apertures, means for locating said wrapped package group to stand stationary on said guideway at a locking station, tightening means at said locking station incorporating lug members reciprocable laterally of said guideway and operable to rise inwardly of said guide means within the apertures in said overlapping blank portions upon reciprocation inwardly of said guideway and to dwell at the end of the inward reciprocation thereof for drawing and holding said wrapper blank tight about said package group while supported on said guideway, and means operable inwardly of said guide means at said locking station in timed relation to the dwell of said tightening means for securing the interlocking means in said overlapping blank portions while said wrapper blank is drawn tight and while said wrapped package group remains stationary.

7. Apparatus for packaging articles in a wrapper blank proportioned to fold over and to overlap for securing beneath a package group of said articles, said apparatus comprising a first guide means for supporting and positioning a package group at a folding station to have said wrapper blank folded downwardy over and overlapped beneath said package group and guide means therefor while said package group remains stationary at said folding station, said guide means being formed to allow subsequent stripping of said package group and folded wrapper blank therefrom, a second guide means aligned with said first guide means for receiving therefrom and positioning a stripped package group and folded wrapper blank and for supporting said package group and wrapper blank adjacent the bottom side edges thereof with said overlapping blank portions exposed for gripping to draw said wrapper blank tight about said package group while supported and positioned by said second guide means and while remaining stationary thereon, and tightening means incorporating lug members reciprocable laterally of said second guide means and operable upon reciprocation inwardly of said guide means to rise within the apertures in said overlapping blank portions and to dwell at the end of the inward reciprocation thereof for drawing and holding said wrapper blank tight about said package group for securing.

References Cited in the file of this patent

UNITED STATES PATENTS

| | | |
|---|---|---|
| 2,677,221 | Currie | May 4, 1954 |
| 2,751,730 | Gentry | June 26, 1956 |